United States Patent
Knebel

(10) Patent No.: US 12,297,338 B2
(45) Date of Patent: May 13, 2025

(54) THERMOPLASTIC POLYMER COMPOSITIONS WITH IMPROVED FLEXIBILITY

(71) Applicant: SIKA TECHNOLOGY AG, Baar (CH)

(72) Inventor: Oliver Knebel, Lucerne (CH)

(73) Assignee: SIKA TECHNOLOGY AG, Baar (CH)

( * ) Notice: Subject to any disclaimer, the term of this patent is extended or adjusted under 35 U.S.C. 154(b) by 538 days.

(21) Appl. No.: 17/604,468

(22) PCT Filed: Jun. 24, 2020

(86) PCT No.: PCT/EP2020/067763
§ 371 (c)(1),
(2) Date: Oct. 18, 2021

(87) PCT Pub. No.: WO2020/260428
PCT Pub. Date: Dec. 30, 2020

(65) Prior Publication Data
US 2022/0213304 A1    Jul. 7, 2022

(30) Foreign Application Priority Data
Jun. 24, 2019 (EP) .................. 19181978

(51) Int. Cl.
| | | |
|---|---|---|
| C08L 23/16 | (2006.01) | |
| B29C 48/00 | (2019.01) | |
| B29C 48/88 | (2019.01) | |
| B29C 63/02 | (2006.01) | |
| B29C 65/00 | (2006.01) | |
| B29C 65/02 | (2006.01) | |
| C08J 5/18 | (2006.01) | |
| C08L 23/18 | (2025.01) | |
| B29K 105/00 | (2006.01) | |

(52) U.S. Cl.
CPC .......... *C08L 23/16* (2013.01); *B29C 48/0011* (2019.02); *B29C 48/022* (2019.02); *B29C 48/911* (2019.02); *B29C 63/02* (2013.01); *B29C 65/02* (2013.01); *B29C 66/43* (2013.01); *C08J 5/18* (2013.01); *B29K 2105/0085* (2013.01); *C08J 2323/16* (2013.01); *C08J 2423/20* (2013.01); *C08L 23/18* (2013.01); *C08L 2205/03* (2013.01); *C08L 2207/02* (2013.01)

(58) Field of Classification Search
CPC ...... C08L 23/16; C08L 23/18; C08L 2205/03; C08L 2207/02
See application file for complete search history.

(56) References Cited

U.S. PATENT DOCUMENTS

| | | | |
|---|---|---|---|
| 5,552,482 A * | 9/1996 | Berta ..................... | C08L 23/12 525/193 |
| 9,932,470 B2 * | 4/2018 | Biondini ................. | E04B 1/942 |
| 10,160,889 B2 * | 12/2018 | Botros .................... | C08L 51/06 |
| 10,913,842 B2 * | 2/2021 | Talreja ................... | H01B 3/441 |
| 2011/0190450 A1 * | 8/2011 | De Palo .................. | C08J 5/18 525/240 |

FOREIGN PATENT DOCUMENTS

| | | | | |
|---|---|---|---|---|
| EP | 3 438 184 A1 | 2/2019 | | |
| WO | 2012/052429 A1 | 4/2012 | | |
| WO | 2012/152803 A1 | 11/2012 | | |
| WO | 2013/144060 A1 | 10/2013 | | |
| WO | 2015/055433 A1 | 4/2015 | | |
| WO | WO-2016130556 A1 * | 8/2016 | ............. | B32B 27/08 |
| WO | WO-2018058344 A1 * | 4/2018 | ............. | C08L 23/16 |

OTHER PUBLICATIONS

Koattro KTAR05 technical data sheet. Jun. 20, 2016. (Year: 2016).*
Adflex KS 311P technical data sheet. May 14, 2024. (Year: 2024).*
Versify Plastomers and Elastomers Product Selection Guide. Apr. 2014. (Year: 2014).*
Aug. 20, 2020 International Search Report issued in International Patent Application No. PCT/EP2020/067763.
Aug. 20, 2020 Written Opinion of the International Searching Authority issued in International Patent Application No. PCT/EP2020/067763.

* cited by examiner

*Primary Examiner* — Rip A Lee
(74) *Attorney, Agent, or Firm* — Oliff PLC

(57) ABSTRACT

A thermoplastic composition has at least one butene-1 (co)polymer, at least one heterophasic propylene copolymer, and at least one propylene-based elastomer. Further, the thermoplastic composition can be used to produce a shaped article, a shaped article can include a substrate layer including the thermoplastic composition, a method can produce a shaped article, and a method can cover a substrate using the shaped articles.

16 Claims, No Drawings

THERMOPLASTIC POLYMER COMPOSITIONS WITH IMPROVED FLEXIBILITY

TECHNICAL FIELD

The invention relates to thermoplastic polymer compositions and use thereof for producing industrial liners, such as waterproofing and roofing membranes.

BACKGROUND OF THE INVENTION

In the field of construction polymeric sheets, which are often referred to as membranes or panels, are used to protect underground and above ground constructions, such as basements, tunnels, and flat and low-sloped roofs, against penetration water. Waterproofing membranes are applied, for example, to prevent ingress of water through cracks that develop in the concrete structure due to building settlement, load deflection or concrete shrinkage. Roofing membranes are applied on a surface of roof substrate to be waterproofed, such as an insulation board or a cover board in flat and low-sloped roof structures. Waterproofing and roofing membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may, for example, be a concrete, metal, or wood deck, or it may include an insulation board or recover board and/or an existing membrane.

Commonly used materials for waterproofing and roofing membranes include plastics, in particular thermoplastics such as plasticized polyvinylchloride (p-PVC), thermoplastic olefin elastomers (TPE-O), and elastomers such as crosslinked ethylene-propylene diene monomer (EPDM). Thermoplastic olefin elastomers (TPE-O), also known as thermoplastic polyolefins (TPO), are specific types of heterophasic polyolefin compositions. These are blends of a high-crystallinity "base polyolefin", typically having a melting point of 100° C. or more, and a low-crystallinity or amorphous "polyolefin modifier", typically having a glass transition temperature of −20° C. or less. The heterophasic phase morphology consists of a matrix phase composed primarily of the base polyolefin and a dispersed phase composed primarily of embedded particles of the polyolefin modifier. Commercially available TPOs include reactor blends of the base polyolefin and the polyolefin modifier as well as physical blends of the base polyolefin and the polyolefin modifier. A reactor blend is typically produced using a sequential polymerization process, wherein the constituents of the matrix phase are produced in a first reactor and transferred to a second reactor, where the constituents of the dispersed phase are produced and incorporated as domains into the matrix phase. Physical blend-type TPOs are produced by melt-blending the base polyolefin with the polyolefin modifier each of which was separately formed prior to blending of the components. Reactor blend-type TPOs are commonly characterized as "in-situ TPOs or "reactor TPOs" or as "heterophasic copolymers".

TPOs have been widely used as materials in providing commercially available roofing membranes due to their numerous advantageous properties. Unlike membranes composed of crosslinked elastomers, TPO membranes are thermoplastic, which enables bonding of the edge portions of overlapped membranes to each other by heat-welding. TPO membranes are also considered to provide an advantage over plasticized PVC membranes, since they are free of environmentally harmful plasticizers. The most significant disadvantage of TPO membranes is that they are less flexible compared to membranes prepared from plasticized PVC or crosslinked elastomers, such as EPDM. The lower flexibility of the TPO membranes is especially pronounced at low temperatures, in particular at temperatures below 0° C. Membranes having a high flexibility are particularly preferred in roofing applications since they enable easier installation, especially in corner and edge areas.

Flexibility of a TPO-based material can be improved, for example, by increasing the proportion of the low-crystallinity polyolefin modifier component in the blend. However, this approach has been found out to result in increased tackiness of the TPO-material and consequently in increased blocking of the membrane. The blocking of a membrane is generally not desired since it complicates various post-processing steps such as cutting, welding, stacking, and unwinding the membrane from a roll. Another approach taken to increase the flexibility of a TPO-material has been to decrease the crystallinity of the matrix phase of the TPO. These types of TPOs typically exhibit a low flexural modulus but they also have a low softening point, which significantly limits their applicability in roofing applications. Flexibility of a TPO material can also be increased adding of mineral oils as plasticizers into the material. Also these approaches have turned out to be less successful since the mineral oils, even if selected to have a low vapor pressure and high viscosity, tend to migrate over time from the polymer matrix. The migration of the mineral oils renders these types of TPO materials less suitable for use in roofing applications, where the membrane is often exposed to relatively high temperatures, such as in the range of 60 to 80° C.

There is thus a need for a novel type of thermoplastic polymer composition, which can be used for providing shaped articles, in particular waterproofing and roofing membranes, exhibiting an improved cold flexibility compared to the State-of-the-Art TPO-based membranes. Furthermore, the novel type of thermoplastic polymer composition should also exhibit low tendency for blocking, excellent mechanical properties, and high stability at elevated temperatures.

SUMMARY OF THE INVENTION

The object of the present invention is to provide a thermoplastic composition suitable for use in preparing shaped articles having an improved flexibility, in particular at low temperatures.

It is further an object of the present invention to provide a thermoplastic composition, which is suitable for use in preparing shaped articles, such as waterproofing and roofing membranes, exhibiting low tendency for blocking, excellent mechanical properties, and high stability at elevated temperatures.

It has been surprisingly found out that butene-1 (co) polymers having a high content of butene-1 derived monomer units, in particular of at least 70 wt.-%, preferably at least 75 wt.-%, can be used to significantly increase the flexibility of a polymer component comprising at least one heterophasic propylene copolymer.

It has also been surprisingly found out that the blending of the above described butene-1 copolymers with heterophasic propylene copolymers enables providing highly filled thermoplastic compositions having a low flexural modulus at a temperature of −30° C.

Other subjects of the present invention are presented in other independent claims. Preferred aspects of the invention are presented in the dependent claims.

DETAILED DESCRIPTION OF THE INVENTION

The subject of the present invention is a thermoplastic composition comprising a polymer component comprising:
a) At least one butene-1 (co)polymer and/or at least one ethylene-based olefin block copolymer,
b) At least one heterophasic propylene copolymer, and
c) At least one propylene-based elastomer, wherein the at least one butene-1 (co)polymer has a content of butene-1 derived units of at least 70 wt.-%, preferably at least 75 wt.-%, more preferably at least 80 wt.-%, even more preferably at least 84 wt.-%.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "α-olefin" designates an alkene having the molecular formula $C_xH_{2x}$ (x corresponds to the number of carbon atoms), which features a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene. For example, neither 1,3-butadiene, nor 2-butene, nor styrene are referred as "α-olefins" according to the present disclosure.

The term "thermoplastic" refers to any material which can be melted and re-solidified with little or no change in physical properties.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column, and tetrahydrofurane as a solvent, at a temperature of 35° C.

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using a rheometer in torsional mode (with cyclic torsional load) with an applied frequency of 1 Hz and a strain level (amplitude) of 1%.

The term "softening point" refers to a temperature at which compound softens in a rubber-like state, or a temperature at which the crystalline portion within the compound melts. The softening point is preferably determined by Ring and Ball measurement conducted according to DIN EN 1238 standard.

The term "melting temperature" refers to a temperature at which a material undergoes transition from the solid to the liquid state. The melting temperature ($T_m$) is preferably determined by differential scanning calorimetry (DSC) according to ISO 11357 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

"Comonomer content of a copolymer" refers to the total amount of comonomers in the copolymer given in wt.-% or mol-%. The comonomer content can be determined by IR spectroscopy or by quantitative nuclear-magnetic resonance (NMR) measurements.

The "amount or content of at least one component X" in a composition, for example "the amount of the at least one thermoplastic polymer" refers to the sum of the individual amounts of all thermoplastic polymers contained in the composition. For example, in case the composition comprises 20 wt.-% of at least one thermoplastic polymer, the sum of the amounts of all thermoplastic polymers contained in the composition equals 20 wt.-%.

The term "room temperature" designates a temperature of 23° C.

The thermoplastic composition of the present invention is preferably a physical blend of its constituents, i.e. the thermoplastic composition has been obtained by blending the constituents of the thermoplastic composition with each other, wherein each of said constituents was separately formed prior to blending of the constituents.

The thermoplastic composition comprises a polymer component comprising the constituents a), b), and c). The amount of the polymer component in the thermoplastic composition is not particularly restricted and it depends on the intended use of the thermoplastic composition, in particular on the amount of fillers, flame retardants, and other additives contained in the thermoplastic composition. Preferably, the polymer component comprises at least 25 wt.-%, more preferably at least 35 wt.-%, even more preferably at least 40 wt.-%, still more preferably at least 45 wt.-% of the total weight of the thermoplastic composition.

According to one or more embodiments, the polymer component comprises 35-85 wt.-%, preferably 40-80 wt.-%, more preferably 45-75 wt.-% of the total weight of the thermoplastic composition. According to one or more further embodiments, the polymer component comprises at least 65 wt.-%, preferably at least 75 wt.-%, more preferably at least 85 wt.-% of the total weight of the thermoplastic composition.

The thermoplastic composition of the present invention comprises at least one butene-1 (co)polymer. The term "(co)polymer" is understood to include homopolymers, copolymers, random copolymers, block copolymers, and terpolymers. The at least one butene-1 (co)polymer can be a homopolymer or a copolymer of butene-1 with one more comonomers (different from butene-1), preferably one or more α-olefins. Suitable α-olefins present as comonomers in the butene-1 (co)polymer include ethylene, propylene, pentene-1, hexane-1,4-methylpentene and octene-1. According to one or more embodiments, the at least one butene-1 (co)polymer has a content of butene-1 derived units of at least 75 mol-%, preferably at least 80 mol-%, more preferably at least 85 mol.-%.

The at least one butene-1 (co)polymer contained in the thermoplastic composition of the present invention can be obtained, for example, by using any one of the methods as disclosed in WO 2012/052429 A1. Suitable butene-1 (co) polymers are commercially available, for example, under the trade name of Koattro®, such as Koattro KT MR 05 (from Lyondell Basell).

According to one or more embodiments, the at least one butene-1 (co)polymer has:
- a flexural modulus at 23° C., determined according to ISO 178 standard, of not more than 150 MPa, preferably not more than 125 MPa, more preferably not more than 75 MPa, even more preferably not more than 50 MPa, still more preferably not more than 35 MPa, in particular not more than 25 MPa, most preferably not more than 15 MPa and/or
- a melt flow rate (190° C./2.16 kg), determined according to ISO 1133-1 standard, of not more than 15 g/10 min, preferably not more than 10 g/10 min, more preferably not more than 7.5 g/10 min, even more preferably not more than 5 g/10 min, in particular not more than 3.5 g/10 min, most preferably not more than 2.5 g/10 min and/or
- a melting temperature ($T_m$), determined by DSC according to ISO 11357 standard using a heating rate of 2° C./min, of not more than 110° C., preferably not more than 100° C., more preferably not more than 85° C., even more preferably not more than 75° C., in particular not more than 65° C., most preferably not more than 50° C. and/or
- a polydispersity index ($M_w/M_n$), determined by GPC, of not more than 5, preferably in the range of 1.5-5, more preferably 1.5-4.5, even more preferably 2-4.5, still more preferably 2-4 and/or
- a glass transition temperature ($T_g$), determined by dynamical mechanical analysis (DMA) as the peak of the measured loss modulus (G") using a cyclic torsional load with a frequency of 1 Hz and a strain level of 1%, of below −10° C., preferably below −15° C., more preferably below −20° C., even more preferably below −25° C. and/or
- an intrinsic viscosity, determined in tetralin at temperature of 135° C. according to ISO 1628-3:2010 standard, of 1-5 dL/g, preferably of 1-4.5 dL/g, more preferably 1.5-4 dL/g, even more preferably 1.5-3.5 dL/g, still more preferably 1.5-2.5 dL/g.

According to one or more embodiments, the at least one butene-1 (co)polymer is a homopolymer of butene-1 or a copolymer of butene-1 with one or more α-olefins, preferably selected from the group consisting of ethylene and propylene, wherein the copolymer preferably has a content of comonomer derived units of not more than 25 mol-%, preferably not more than 20 mol-%, more preferably 1-20 mol-%, even more preferably 1-15 mol-%.

According to one or more embodiments, the thermoplastic composition comprises, in addition to or instead of the at least one butene-1 (co)polymer, at least one ethylene-based olefin block copolymer. It goes without saying that the at least one ethylene-based olefin block copolymer is different from the at least one butene-1 (co)polymer.

According to one or more embodiments, the at least one ethylene-based olefin block copolymer is an ethylene-α-olefin block copolymer.

Suitable comonomers for the at least one ethylene-α-olefin block copolymer include, for example, linear and branched α-olefins having 3 to 30 carbon atoms. According to one or more embodiments, the comonomer in the at least one ethylene-α-olefin block copolymer is selected from the group consisting of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene, preferably form the group consisting of propylene, 1-butene, 1-hexene, and 1-octene.

Preferably, the at least one ethylene-α-olefin block copolymer has a content of ethylene derived units of at least 50 wt.-%, preferably at least 55 wt.-%, more preferably at least 60 wt.-%. According to one or more embodiments, the at least one ethylene-α-olefin block copolymer has a content of ethylene derived units in the range of 55-85 wt.-%, preferably 60-85 wt.-%, more preferably 60-80 wt.-%.

According to one or more embodiments, the at least one ethylene-α-olefin block copolymer has:
- a tensile modulus, 100% secant, determined according to ASTM D638 standard at 23±2° C., of not more than 50 MPa, preferably not more than 35 MPa, more preferably not more than 15 MPa, even more preferably not more than 10 MPa, still more preferably not more than 5 MPa, most preferably not more than 3.5 MPa and/or
- an ultimate tensile elongation, determined according to ASTM D638 at 23±2° C., of at least 450%, preferably at least 600%, more preferably at least 750%, even more preferable at least 850%, still more preferably at least 1000% and/or
- a melt flow rate (190° C./2.16 kg), determined according to ASTM D1238 standard, of not more than 20 g/10 min, preferably not more than 15 g/10 min, more preferably not more than 10 g/10 min, even more preferably not more than 7.5 g/10 min and/or
- a glass transition temperature ($T_g$), determined by dynamical mechanical analysis (DMA) as the peak of the measured loss modulus (G") using a cyclic torsional load with a frequency of 1 Hz and a strain level of 1%, of below −10° C., preferably below −25° C., more preferably below −35° C., even more preferably below −50° C.

According to one or more embodiments, the at least one ethylene-α-olefin block copolymer is an ethylene-octene block copolymer. Suitable ethylene-octene block copolymers are commercially available, for example, under the trade name of Infuse®, such as Infuse® 9100, Infuse® 9107, Infuse® 9500, Infuse® 9507, Infuse® 9530, Infuse® 9807, and Infuse® 9817 (all from Dow Chemical Company).

Preferably, the polymer component of the thermoplastic composition comprises at least 1.5 wt.-%, more preferably at least 2.5 wt.-%, even more preferably at least 5 wt.-% of the at least one butene-1 (co)polymer and/or at least 1.5 wt.-%, more preferably at least 2.5 wt.-%, even more preferably at least 5 wt.-% of the at least one ethylene-based olefin block copolymer, based on the total weight of the polymer component.

According to one or more embodiments, the polymer component of the thermoplastic composition comprises 1.5-75 wt.-%, preferably 2.5-70 wt.-%, more preferably 2.5-65 wt.-%, even more preferably 5-60 wt.-%, still more preferably 5-50 wt.-%, most preferably 5-35 wt.-%, of the at least one butene-1 (co)polymer or 1.5-75 wt.-%, preferably 2.5-

70 wt.-%, more preferably 2.5-65 wt.-%, even more preferably 5-60 wt.-%, still more preferably 5-50 wt.-%, most preferably 5-35 wt.-%, of the at least one ethylene-based olefin block copolymer, based on the total weight of the polymer component.

The thermoplastic composition of the present invention further comprises at least one heterophasic propylene copolymer.

Preferably, the at least one heterophasic propylene copolymer comprises:
A) a high-crystallinity polypropylene having a melting point ($T_m$) of 100° C. or more, preferably propylene homopolymer and/or random copolymer of propylene having a relatively low comonomer content, such as less than 5 wt.-%, and
B) a polyolefin having a glass transition temperature ($T_g$) of −20° C. or less, preferably one or more ethylene copolymers having a relatively high comonomer content, such as at least 5 wt.-%, preferably at least 10 wt.-%, and having a glass transition temperature ($T_g$) of −30° C. or less, preferably −40° C. or less, preferably ethylene-propylene-rubber (EPR),
wherein the at least one heterophasic propylene copolymer comprises a matrix phase composed primarily of A) and a dispersed phase composed primarily of B).

Preferably, the at least one heterophasic propylene copolymer is a reactor blend of A) and B), wherein the reactor blend has been obtained by using a sequential polymerization process, wherein constituents of the matrix phase are produced in a first reactor and transferred to a second reactor where constituents of the dispersed phase are produced and incorporated as domains into the matrix phase.

Suitable heterophasic propylene copolymers that are commercially available include, for example, the "reactor TPOs" produced with LyondellBasell's Catalloy process technology, which are available under the trade names of Adflex®, Adsyl®, Clyrell®, Hifax®, Hiflex®, and Soften®. Further suitable heterophasic propylene copolymers that are commercially available include, for example, heterophasic ethylene-propylene random copolymers, which are available under the trade name of Borsoft®, such as Borsoft® SD233 CF (from Borealis Polymers).

According to one or more embodiments, the at least one heterophasic propylene copolymer has:
a flexural modulus at 23° C., determined according to ISO 178 standard, of not more than 1000 MPa, preferably not more than 750 MPa, more preferably not more than 700 MPa, even more preferably not more than 650 MPa, still more preferably not more than 600 MPa, most preferably not more than 500 MPa and/or
a xylene cold soluble content, determined according to ISO 16152-2005, of not more than 50 wt.-%, preferably not more than 45 wt.-%, more preferably not more than 40 wt.-%, even more preferably not more than 35 wt.-% and/or
a melt flow rate (2.16 kg at 230° C.), determined according to ISO 1133-1 standard, of not more than 50 g/10 min, preferably not more than 30 g/10 min, more preferably not more than 25 g/10 min, even more preferably not more than 15 and/or
a melting temperature ($T_m$), determined by DSC according to ISO 11357 standard using a heating rate of 2° C./min, of at least 100° C., preferably at least 110° C., more preferably at least 120° C., even more preferably at least 130° C.

According to one or more embodiments, the at least one heterophasic propylene copolymer is a heterophasic ethylene-propylene copolymer, preferably having a content of ethylene derived units of not more than 35 wt.-%, preferably not more than 30 wt.-%, more preferably not more than 25 wt.-%, even more preferably not more than 20 wt.-%, still more preferably not more than 15 wt.-%, most preferably not more than 10 wt.-%.

According to one or more embodiments, the at least one heterophasic propylene copolymer comprises at least one heterophasic ethylene-propylene random copolymer. According to one of more embodiments, the at least one heterophasic propylene copolymer is a heterophasic ethylene-propylene random copolymer.

Preferably, the at least one heterophasic propylene copolymer comprises at least 5 wt.-%, more preferably at least 10 wt.-%, even more preferably at least 15 wt.-%, still more preferably at least 25 wt.-%, of the total weight of the polymer component of the thermoplastic composition.

The thermoplastic composition further comprises at least one propylene-based elastomer.

Suitable propylene-based elastomers include, in particular, copolymers of propylene and at least one comonomer selected from the group consisting of ethylene and C4-C10 α-olefins, wherein the copolymer has a content of propylene-derived units of at least 65 wt.-%, preferably at least 70 wt.-% and a content of units derived from at least one of ethylene or a C4-C10 α-olefin of 1-35 wt.-%, preferably 5-25 wt.-%.

According to one or more embodiments, the at least one propylene-based elastomer is propylene-ethylene copolymer having a content of propylene derived units of 75-95 wt.-%, preferably 80-90 wt.-% and a content of ethylene derived units of 5-25 wt.-%, preferably 9-18 wt.-%.

According to one or more embodiments, the at least one propylene-based elastomer has:
a flexural modulus at 23° C., determined according to ISO 178 standard, of not more than 100 MPa, preferably not more than 50 MPa, more preferably not more than 35 MPa, even more preferably not more than 25 MPa, still more preferably not more than 15 MPa and/or
a melting temperature ($T_m$), determined by DSC according to ISO 11357 standard using a heating rate of 2° C./min, of not more than 110° C., preferably not more than 105° C., more preferably not more than 100° C. and/or
a heat of fusion ($H_f$), determined by DSC using a heating rate of 10°/min, of not more than 80 J/g, preferably not more than 70 J/g, more preferably not more than 65 J/g, even more preferably not more than 50 J/g and/or
a xylene cold soluble content, determined according to ISO 16152-2005, of at least 75 wt.-%, preferably at least 80 wt.-%, more preferably at least 85 wt.-%, even more preferably at least 90 wt.-%, still more preferably at least 95 wt.-% and/or
a softening temperature ($T_s$), determined by Ring and Ball measurement according to DIN EN 1238 standard, of not more than 90° C., preferably not more than 80° C., more preferably not more than 70° C. and/or
a melt flow rate (2.16 kg at 230° C.), determined according to ISO 1133-1 standard, of not more than 50 g/10 min, preferably not more than 40 g/10 min, more preferably not more than 35 g/10 min and/or
an average molecular weight ($M_n$) in the range of 10,000-250,000 g/mol, preferably 25,000-200,000 g/mol.

According to one or more embodiments, the at least one propylene-based elastomer comprises at least 5 wt.-%, preferably at least 10 wt.-%, more preferably at least 15 wt.-%, even more preferably at least 25 wt.-%, of the total weight of the polymer component of the thermoplastic composition.

According to one or more embodiments, the weight ratio of the amount of the at least one heterophasic propylene copolymer to the amount of the at least one propylene-based elastomer is from 0.1:1 to 10:1, preferably from 0.3:1 to 3:1, more preferably from 0.5:1 to 2:1, even more preferably from 0.75:1 to 1.3:1, still more preferably from 0.8:1 to 1.25.1.

According to one or more embodiments, the polymer component of the thermoplastic composition comprises the at least one butene-1 (co)polymer and the at least one heterophasic propylene copolymer, wherein the at least one butene-1 (co)polymer preferably comprises at least 1.5 wt.-%, preferably at least 2.5 wt.-%, more preferably at least 5 wt.-%, such as 1.5-75 wt.-%, preferably 2.5-70 wt.-%, more preferably 2.5-65 wt.-%, even more preferably 5-60 wt.-%, still more preferably 5-50 wt.-%, most preferably 5-35 wt.-% of the total weight of the polymer component, wherein the polymer component preferably comprises at least 15 wt.-%, more preferably at least 25 wt.-%, even more preferably at least 35 wt.-%, still more preferably at least 40 wt.-% of the total weight of the thermoplastic composition.

According to one or more embodiments, the polymer component of the thermoplastic composition comprises the at least one ethylene-based olefin block copolymer and the at least one heterophasic propylene copolymer, wherein the at least one ethylene-based olefin block copolymer preferably comprises at least 1.5 wt.-%, more preferably at least 2.5 wt.-%, even more preferably at least 5 wt.-%, such as 1.5-75 wt.-%, preferably 2.5-70 wt.-%, more preferably 2.5-65 wt.-%, even more preferably 5-60 wt.-%, still more preferably 5-50 wt.-%, most preferably 5-35 wt.-% of the total weight of the polymer component, wherein the polymer component preferably comprises at least 15 wt.-%, more preferably at least 25 wt.-%, even more preferably at least 35 wt.-%, still more preferably at least 40 wt.-% of the total weight of the thermoplastic composition.

According to one or more embodiments, the polymer component of the thermoplastic composition is composed of the at least one butene-1 (co)polymer, the at least one heterophasic propylene copolymer, and the at least one propylene-based elastomer, wherein the polymer component preferably comprises:

a) At least 1.5 wt.-%, preferably at least 2.5 wt.-%, more preferably at least 5 wt.-%, such as 1.5-75 wt.-%, preferably 2.5-70 wt.-%, more preferably 2.5-65 wt.-%, even more preferably 5-60 wt.-%, still more preferably 5-50 wt.-%, most preferably 5-35 wt.-%, of the at least one butene-1 (co)polymer, b) Not more than 85 wt.-%, preferably not more than 75 wt.-%, such as 5-75 wt.-%, preferably 10-65 wt.-%, more preferably 15-60 wt.-%, even more preferably 25-55 wt.-%, still more preferably 30-50 wt.-%, of the at least one heterophasic propylene copolymer, and c) Not more than 85 wt.-%, preferably not more than 75 wt.-%, such as 5-75 wt.-%, preferably 10-65 wt.-%, more preferably 15-60 wt.-%, even more preferably 25-55 wt.-%, still more preferably 30-50 wt.-%, of the at least one propylene-based elastomer, all proportions being based on the total weight of the polymer component, wherein the polymer component preferably comprises at least 15 wt.-%, more preferably at least 25 wt.-%, even more preferably at least 35 wt.-%, still more preferably at least 40 wt.-%, of the total weight of the thermoplastic composition.

According to one or more embodiments, the polymer component of the thermoplastic composition is composed of the at least one ethylene-based olefin block copolymer, the at least one heterophasic propylene copolymer, and the at least one propylene-based elastomer, wherein the polymer component preferably comprises:

a) At least 1.5 wt.-%, preferably at least 2.5 wt.-%, more preferably at least 5 wt.-%, such as 1.5-75 wt.-%, preferably 2.5-70 wt.-%, more preferably 2.5-65 wt.-%, even more preferably 5-60 wt.-%, still more preferably 5-50 wt.-%, most preferably 5-35 wt.-%, of the at least one ethylene-based olefin block copolymer, b) Not more than 85 wt.-%, preferably not more than 75 wt.-%, such as 5-75 wt.-%, preferably 10-65 wt.-%, more preferably 15-60 wt.-%, even more preferably 25-55 wt.-%, still more preferably 30-50 wt.-%, of the at least one heterophasic propylene copolymer, and c) Not more than 85 wt.-%, preferably not more than 75 wt.-%, such as 5-75 wt.-%, preferably 10-65 wt.-%, more preferably 15-60 wt.-%, even more preferably 25-55 wt.-%, still more preferably 30-50 wt.-%, of the at least one propylene-based elastomer, all proportions being based on the total weight of the polymer component, wherein the polymer component preferably comprises at least 15 wt.-%, more preferably at least 25 wt.-%, even more preferably at least 35 wt.-%, still more preferably at least 40 wt.-%, of the total weight of the thermoplastic composition.

Preferably, the thermoplastic composition is not tacky at a temperature of 23° C. The term "tacky" refers in the present disclosure to a surface tack in the sense of instantaneous adhesion or stickiness that is preferably sufficient so that, when pressed with a thumb, exerting a pressure of 5 kg for 1 second on the surface of the composition, the thumb remains sticking to the surface of the composition, preferably such that a composition having an intrinsic weight of 50 g can be lifted up for at least 5 seconds.

According to one or more embodiments, the thermoplastic composition is substantially free of tackifying resins. The term "tackifying resin" designates in the present disclosure resins that in general enhance the adhesion and/or tackiness of a composition. Typical tackifying resins include synthetic resins, natural resins, and chemically modified natural resins having a relatively low average molecular weight ($M_n$), such as not more than 3'500 g/mol, in particular not more than 2'500 g/mol. The expression "essentially free of tackifying resins" is understood to mean that the amount of tackifying resins is preferably less than 1.0 wt.-%, more preferably less than 0.5 wt.-%, even more preferably less than 0.1 wt.-%, still more preferably less than 0.05 wt.-%, based on the total weight of the thermoplastic composition.

According to one or more embodiments, the thermoplastic composition further comprises at least one flame retardant. These may be needed, in particular, in case the thermoplastic composition is used for preparing roofing membranes.

According to one or more embodiments, the at least one flame retardant comprises 1-55 wt.-%, preferably 5-50 wt.-%, more preferably 10-50 wt.-%, even more preferably 15-50 wt.-%, still more preferably 20-40 wt.-% of the total weight of the thermoplastic composition. The at least one flame retardant, if used, is preferably selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Other suitable flame retardants include, for example, 1,3,5-triazine compounds, such as melamine, melam, melem, melon, ammeline, ammelide, 2-ureidomelamine, acetoguanamine, benzoguanamine, diaminophenyltriazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethylisocyanaurate, 1,3,5-triglycidylisocyanaurate, triallylisocyanurate and derivatives of the aforementioned compounds.

Suitable flame retardants are commercially available, for example, under the trade name of Martinal® and Magnifin® (both from Albemarle) and under the trade names of Exolit® (from Clariant), Phos-Check® (from Phos-Check) and FR CROS® (from Budenheim).

According to one or more embodiments, the at least one flame retardant has a median particle size $d_{50}$ of not more than 25 μm, preferably not more than 15 μm, more preferably not more than 10 μm, even more preferably not more than 5 μm. The term "median particle size $d_{50}$" refers to a particle size below which 50% of all particles by mass are smaller than the $d_{50}$ value. The term "particle size" refers in the present disclosure to the area-equivalent spherical diameter of a particle. The particle size distribution can be determined by laser diffraction method as described in ISO 13320:2009 standard.

The thermoplastic composition can further comprise one or more auxiliary compounds, such as UV- and heat stabilizers, antioxidants, plasticizers, fillers, dyes, and pigments, such as titanium dioxide and carbon black, matting agents, antistatic agents, impact modifiers, biocides, and processing aids such as lubricants, slip agents, antiblock agents, and denest aids. The total amount of these auxiliary components is preferably not more than 45 wt.-%, more preferably not more than 35 wt.-%, even more preferably not more than 25 wt.-%, still more preferably not more than 15 wt.-%, based on the total weight of the thermoplastic composition.

Suitable fillers to be used in the thermoplastic composition include, for example, inert mineral fillers. The term "inert mineral filler" designates in the present disclosure mineral fillers, which, unlike mineral binders do not undergo a hydration reaction in the presence of water.

Suitable inert mineral fillers include, for example, sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The inert mineral fillers, if used, are preferably present in the thermoplastic composition in form of solid particles, preferably having a $d_{90}$ particle size of not more than 250 μm, more preferably not more than 150 μm, even more preferably not more than 100 μm, still more preferably not more than 50 μm. The term "$d_{90}$ particle size" refers to a particle size below which 90% of all particles by mass are smaller than the $d_{90}$ value.

One of the advantages of the thermoplastic composition of the present invention is that a shaped article consisting of the thermoplastic composition exhibits low blocking behavior, which enables unproblematic post-processing of the substrate layer, such as cutting, welding, stacking, and unwinding from a roll. According to one or more embodiments, a shaped article composed of the thermoplastic composition of the present invention has a blocking value, determined by means of the method as described below, of not more than 10 N/15 mm, preferably not more than 5 N/15 mm, more preferably not more than 3.5 N/15 mm.

Measurement of the Blocking Value

The blocking value is determined based on the measurement method as defined in DIN 53366 standard. The measurement is conducted at a temperature of 23° C. using a peeling mode instead of a shearing mode, i.e. the tested sheets are separated from each other by using a peeling force. The blocking value is determined as force in N/15 mm width of sheet required to separate the two sheets from each other after the sheets have been pressed together for a period of 72 hours at a temperature of 50° C. using a pressure of 0.5 kg/cm².

Another advantage of the thermoplastic composition of the present invention is that the increased cold flexibility can be achieved without having a negative impact on other mechanical properties, such as elongation at break and resistance to impact.

According to one or more embodiments, a shaped article composed of the thermoplastic composition of the present invention has an elongation at break, determined according to ISO 527-2 standard at a temperature of 23° C. using a cross head speed of 100 mm/min, of at least 500%, preferably of at least 650%, more preferably at least 750% and/or a resistance to impact, determined according to EN 12691 type A standard, of at least 1000 mm, preferably at least 1250 mm and/or a resistance to impact, determined according to EN 12691 type B standard, of at least 1000 mm, preferably at least 1250 mm. The elongation at break and resistance to impact are measured with a shaped article composed of the thermoplastic composition of the present invention and having a thickness of 0.8 mm.

The preferences given above for the at least one butene-1 (co)polymer, the at least one ethylene-based block copolymer, the at least one heterophasic propylene copolymer, the at least one propylene-based elastomer, and the at least one flame retardant apply equally to all subjects of the present invention unless stated otherwise.

Another subject of the present invention is use of the thermoplastic composition according to the present invention for producing a shaped article, preferably a waterproofing membrane or a roofing membrane, in particular a roofing membrane.

The thermoplastic composition of the present invention has been found out to be particularly suitable for use in producing of roofing membranes since the composition exhibits a high flexibility, in particular at low temperatures. Furthermore, since the improved cold flexibility can be achieved without the use of rubbers or mineral oils, the thermoplastic composition of the present invention also exhibits a low tendency for blocking as well as a high stability at elevated temperatures.

Another subject of the present invention is a shaped article comprising a substrate layer, wherein the substrate layer comprises or is essentially composed of the thermoplastic composition according to the present invention.

According to one or more embodiments, the substrate layer is a sheet-like element having a first major surface and a second major surface separated from the first major surface by a thickness there between. Preferably, sheet-like element has a length and width at least 5 times, preferably at least 10 times, more preferably at least 15 times greater than the thickness of the element.

According to one or more embodiments, the substrate layer has a thickness, determined according to the DIN EN 1849-2 standard, of 0.05-25 mm, preferably 0.1-15 mm, more preferably 0.1-10 mm, even more preferably 0.1-5 mm, still more preferably 0.25-5 mm, such as 0.25-3.5 mm.

The shaped article may further comprise a reinforcing layer. The reinforcing layer may be fully embedded into the substrate layer or directly or indirectly adhered to one of the major surfaces of the substrate layer. The expression "fully embedded" is understood to mean that the reinforcing layer is fully covered by the matrix of the substrate layer. The expression "directly adhered" is understood to mean that no further layer or substance is present between the layers and that the opposing surfaces of the layers are directly adhered to each other. At the transition area between the two layers, the materials of the layers can also be present mixed with each other. The reinforcing layer and the substrate layer can be indirectly adhered to each other, for example, via a connecting layer, such as a layer of adhesive.

The type of the reinforcing layer, if used, is not particularly restricted. For example, the reinforcing layers commonly used for improving the dimensional stability of roofing membranes can be used. Preferable reinforcing layers include non-woven fabrics, woven fabrics, and non-woven scrims, and combinations thereof.

The term "non-woven fabric" designates in the present disclosure materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric.

The term "non-woven scrim" refers in the present disclosure web-like non-woven products composed of yarns, which lay on top of each other and are chemically bonded to each other. Typical materials for non-woven scrims include metals, fiberglass, and plastics, in particular polyester, polypropylene, polyethylene, and polyethylene terephthalate (PET).

According to one or more embodiments, the reinforcing layer is composed of synthetic organic fibers, preferably selected from the group consisting of polyester fibers, polypropylene fibers, polyethylene fibers, nylon fibers, and polyamide fibers. According to one or more further embodiments, the reinforcing layer is composed of inorganic fibers, preferably selected from the group consisting of glass fibers, aramid fibers, wollastonite fibers, and carbon fibers, more preferably glass fibers.

According to one or more embodiments, the reinforcing layer has been thermally laminated to one of the major surfaces of the substrate layer in a manner that gives direct bonding between the reinforcing layer and the substrate layer. The term "thermal lamination" refers to a process, in which the layers are bonded to each by the application of thermal energy. In particular, the term "thermal lamination" refers to a process comprising partially melting at least one of the layers upon application of thermal energy followed by a cooling step, which results in formation of a physical bond between the layers without using an adhesive.

Another subject of the present invention is a method for producing a shaped article, the method comprising steps of:
i) Introducing the constituents of the thermoplastic composition of the present invention into an extrusion apparatus comprising an extruder and a die,
ii) Melt processing said constituents in the extruder and extruding the melt-processed mixture through the die to obtain an extruded shaped melt, and
iii) Optionally employing spaced apart calender cooling rolls through which the extruded shaped melt is drawn subsequently to step ii).

Suitable extrusion apparatuses comprising at least one extruder and an extruder die are well known to a person skilled in the art. Any conventional extruders, for example, a ram extruder, single screw extruder, or a twin-screw extruder may be used. Preferably, the extruder is a screw extruder, more preferably a twin-screw extruder. The constituents of the thermoplastic composition may be fed to the extruder as individual streams, as a pre-mix, a dry blend, or as a master batch.

Another subject of the present invention is a method for covering a substrate, the method comprising steps of:
I) Applying a first and a second shaped article according to the present invention onto the surface of the substrate to be covered,
II) Overlapping an edge region of the second shaped article over an overlapped section of an upper side of the first shaped article,
III) Heating said edge region and said overlapped section above the melting temperature of the thermoplastic composition and bonding the opposing surfaces of the edge region and the overlapped section to each other under sufficient pressure to provide acceptable seam strength without use of an adhesive.

According to one or more embodiments, the substrate that is covered with the sealing devices is a roof substrate, preferably an insulation board, a cover board, or an existing roofing membrane.

Step III) of the method for covering a substrate can be conducted manually, for example by using a hot air tool, or by using an automatic welding device, such as an automatic hot-air welding device, for example Sarnamatic® 661 welding device. The temperature to which the edge region of the second shaped article and the overlapped section of the first shaped article are heated depends on the embodiment of the first and second shaped articles and also whether the step III) is conducted manually or by using an automatic welding device. Preferably, the edge region of the second shaped article and the overlapped section of the first shaped article are heated to a temperature of at or above 150° C., more preferably at or above 200° C.

Still another subject of the present invention is a waterproofed structure obtained by using the method for covering a substrate.

EXAMPLES

The followings materials were used in the examples:

TABLE 1

| Borsoft SD233CF | Heterophasic random ethylene/propylene copolymer, Flexural modulus (ISO 178) 400 MPa | Borealis AG |
| Vistamaxx 6102 | Propylene-based elastomer, ethylene content 15-16 wt.-% | ExxonMobil |
| ATH | Al(OH)$_3$, >99 wt.-%, d$_{50}$ particle size 1-2.5 µm | Albemarle Corporation |
| Engage 8200 | Ethylene-octene copolymer | Dow Chemical Company |
| Queo 0203 | Ethylene-based octene-1 plastomer | Borealis AG |
| Koattro KT MR 05 | Butene-1 copolymer | LyondellBasell |
| Infuse 9507 | Ethylene-octene block copolymer | Dow Chemical Company |

Preparation of Shaped Articles

The shaped articles (sheets) were produced using a laboratory scale extrusion-calendering apparatus consisting of a twin screw extruder (Berstorff GmbH), a flat die and set of water-cooled calender rolls.

In producing of the shaped articles, the constituents of the thermoplastic composition as shown in Table 2 were fed to the extruder hopper. The blend was melt-processed in the extruder and extruded through a flat die into single ply sheets having a thickness of approximately 1.5 mm. The extrusion was conducted using an extrusion temperature of ca. 180° C.

Flexibility

Flexibility of the shaped articles was determined by measuring the storage modulus (G') of the test specimen at temperatures of −30° C., 0° C., and +30° C.

The storage moduli were measured by dynamical mechanical analysis (DMA) using a method based on ISO 6721-10:2015 standard and
  A deformation amplitude (gamma) of 0.1 to 1%
  Linear frequency of 1 Hz
  Normal force of −0.2 N
  Temperature of −50 to +30° C. and
  Rate of temperature change of 2° C. per minute The values of the storage moduli (G') presented in Table 2 have been obtained with test specimen, which were cut from the shaped articles in a lengthwise direction.

Tensile Strength and Elongation at Break

The tensile strength at break and the elongation at break were measured according to ISO 527-2 standard at a temperature of 23° C. using a cross head speed of 100 mm/min.

The values presented in Table 2 have been obtained with test specimen, which were cut from the shaped articles in a lengthwise direction.

TABLE 2

| | Ref-1 | Ref-2 | Ref-3 | Ex-1 | Ex-2 | Ex-3 | Ref-4 | Ref-5 | Ex-4 | Ex-5 |
|---|---|---|---|---|---|---|---|---|---|---|
| Composition [wt.-%] | | | | | | | | | | |
| Borsoft SD233CF | 45.00 | 37.50 | 37.50 | 42.50 | 37.50 | 37.50 | 30.00 | 23.33 | 23.33 | 23.33 |
| Vistamaxx 6102 | 55.00 | 47.50 | 47.50 | 52.50 | 47.50 | 47.50 | 36.67 | 30.00 | 30.00 | 30.00 |
| ATH | — | — | — | — | — | — | 33.33 | 33.33 | 33.33 | 33.33 |
| Engage 8200 | — | 15.00 | — | — | — | — | — | — | — | — |
| Queo 0203 | — | — | 15.00 | — | — | — | — | 13.33 | — | — |
| Koattro KT MR 05 | — | — | — | 5.00 | 15.00 | — | — | — | 13.33 | — |
| Infuse 9507 | — | — | — | — | — | 15.00 | — | — | — | 13.33 |
| Total | 100.00 | 100.00 | 100.00 | 100.00 | 100.00 | 100.00 | 100.00 | 100.00 | 100.00 | 100.00 |
| Properties Storage modulus G' | | | | | | | | | | |
| @ −30° C. [MPa] | 338 | 318 | 280 | 257 | 247 | 233 | 625 | 470 | 300 | 380 |
| @ 0° C. [MPa] | 46 | 46 | 45 | 31 | 28 | 37 | — | — | — | — |
| @ +30° C. [MPa] | 24 | 26 | 24 | 17 | 15 | 20 | 38 | 33 | 21 | 28 |
| Elongation at break [%] | 907 | 893 | 927 | 920 | 943 | 911 | — | — | — | — |
| Tensile strength @ break [N/mm$^2$] | 14.5 | 9.9 | 12.3 | 13.9 | 14.5 | 12.4 | — | — | — | — |

The invention claimed is:

1. A thermoplastic composition comprising a polymer component comprising:
  at least one butene-1 (co)polymer, wherein the at least one butene-1 (co)polymer is a homopolymer of butene-1 or a copolymer of butene-1 with one or more α-olefin,
  optionally, at least one ethylene-based olefin block copolymer,
  at least one heterophasic propylene copolymer, and
  at least one propylene-based elastomer,
  wherein the at least one butene-1 (co)polymer has a content of butene-1 derived units of at least 70 wt %,
  wherein the at least one ethylene-based olefin block copolymer, when present, is present in an amount of 5-35 wt % based on a total weight of the polymer component, and
  wherein the at least one propylene-based elastomer is a propylene-ethylene copolymer having a content of propylene derived units of 75-95 wt % and a content of ethylene derived units of 5-25 wt %.

2. The thermoplastic composition according to claim 1, comprising the at least one ethylene-based olefin block copolymer, wherein the at least one ethylene-based olefin block copolymer is an ethylene-α-olefin block copolymer.

3. The thermoplastic composition according to claim 1, wherein the at least one heterophasic propylene copolymer has a flexural modulus at 23° C. determined according to ISO 178 standard of not more than 1000 MPa, and/or a xylene cold soluble content (XCS) determined according to ISO 16152-2005 of not more than 50 wt %.

4. The thermoplastic composition according to claim 1, wherein the at least one heterophasic propylene copolymer is a heterophasic ethylene-propylene copolymer, having a content of ethylene derived units of not more than 35 wt %.

5. The thermoplastic composition according to claim 1, wherein the at least one heterophasic propylene copolymer is a heterophasic ethylene-propylene random copolymer.

6. The thermoplastic composition according claim 1, wherein the at least one heterophasic propylene copolymer comprises at least 5 wt % of the total weight of the polymer component.

7. The thermoplastic composition according to claim 1, wherein the at least one propylene-based elastomer has a flexural modulus at 23° C. determined according to ISO 178 standard of not more than 100 MPa, and/or a heat of fusion as determined by DSC using a heating rate of 10°/min of not more than 80 J/g, and/or a xylene cold soluble content (XCS) determined according to ISO 16152-2005 of at least 75 wt %.

8. The thermoplastic composition according to claim 1, wherein the at least one butene-1 (co)polymer has a melting temperature of not more than 110° C.

9. The thermoplastic composition according to claim 1, wherein the composition is substantially free of tackifying resins.

10. The thermoplastic composition according to claim 1 further comprising 1-55 wt % of at least one flame retardant.

11. A method comprising producing a shaped article with the thermoplastic composition according to claim 1.

12. A shaped article comprising a substrate layer comprising the thermoplastic composition according to claim 1.

13. A method for producing a shaped article comprising steps of:
   i) introducing the constituents of the thermoplastic composition as defined in claim 1 into an extrusion apparatus comprising an extruder and a die,
   ii) melt processing the constituents in the extruder and extruding the melt-processed mixture through the die to obtain an extruded shaped melt, and
   iii) optionally employing spaced apart calender cooling rolls through which the extruded shaped melt is drawn subsequently to step ii).

14. A method for covering a substrate comprising steps of:
   I) applying a first and a second shaped article according to claim 12 onto the surface of the substrate to be covered,
   II) overlapping an edge region of one of the second shaped article over an overlapped section of an upper side of the first shaped article,
   III) heating the edge region and the overlapped section above the melting temperature of the thermoplastic composition and bonding the opposing surfaces of the edge region and the overlapped section to each other under sufficient pressure to provide acceptable seam strength without use of an adhesive.

15. A thermoplastic composition comprising a polymer component comprising:
   at least one butene-1 (co)polymer, wherein the at least one butene-1 (co)polymer has a flexural modulus at 23° C. determined according to ISO 178 standard of not more than 150 MPa, and/or a melting temperature determined by DSC according to ISO 11357 standard using a heating rate of 2° C./min of not more than 110° C., and/or a polydispersity index ($M_w/M_n$) determined by GPC of 1.5-5,
   optionally, at least one ethylene-based olefin block copolymer,
   at least one heterophasic propylene copolymer, and
   at least one propylene-based elastomer,
   wherein the at least one butene-1 (co)polymer has a content of butene-1 derived units of at least 70 wt %,
   wherein the at least one ethylene-based olefin block copolymer, when present, is present in an amount of 5-35 wt % based on a total weight of the polymer component, and
   wherein the at least one propylene-based elastomer is a propylene-ethylene copolymer having a content of propylene derived units of 75-95 wt % and a content of ethylene derived units of 5-25 wt %.

16. A thermoplastic composition comprising a polymer component comprising:
   at least one butene-1 (co)polymer
   at least one ethylene-based olefin block copolymer,
   at least one heterophasic propylene copolymer, and
   at least one propylene-based elastomer,
   wherein the at least one butene-1 (co)polymer has a content of butene-1 derived units of at least 70 wt %,
   wherein the at least one ethylene-based olefin block copolymer, when present, is present in an amount of 5-35 wt % based on a total weight of the polymer component, and
   wherein the at least one propylene-based elastomer is a propylene-ethylene copolymer having a content of propylene derived units of 75-95 wt % and a content of ethylene derived units of 5-25 wt %.

* * * * *